United States Patent
Hashizume et al.

(10) Patent No.: US 6,512,152 B1
(45) Date of Patent: Jan. 28, 2003

(54) TETRACYCLODODECENE COMPOSITIONS AND PROCESS FOR PRODUCING THE SAME

(75) Inventors: Masaki Hashizume, Kawasaki (JP); Tomonobu Uchida, Yokohama (JP); Fuyuki Aida, Yokohama (JP); Takashi Suzuki, Yokohama (JP); Yoshihisa Inomata, Yokohama (JP); Yasuo Matsumura, Yokohama (JP)

(73) Assignee: Nippon Petrochemicals Company, Limited, Tokyo (JP)

( * ) Notice: Subject to any disclaimer, the term of this patent is extended or adjusted under 35 U.S.C. 154(b) by 0 days.

(21) Appl. No.: 09/486,388

(22) PCT Filed: Jul. 2, 1999

(86) PCT No.: PCT/JP99/03594

§ 371 (c)(1),
(2), (4) Date: Feb. 28, 2000

(87) PCT Pub. No.: WO00/01742

PCT Pub. Date: Jan. 13, 2000

(30) Foreign Application Priority Data

| Jul. 2, 1998 | (JP) | 10-202701 |
| Jul. 2, 1998 | (JP) | 10-202702 |
| Jul. 2, 1998 | (JP) | 10-202703 |
| Jul. 2, 1998 | (JP) | 10-202704 |

(51) Int. Cl.$^7$ .................. C07C 13/615; C07C 13/28; C07C 403/00

(52) U.S. Cl. .................. 585/360; 585/361; 585/362; 585/21; 585/23

(58) Field of Search .................. 585/360, 361, 585/362, 21, 23

(56) References Cited

U.S. PATENT DOCUMENTS

| 3,557,072 A | 1/1971 | Vergne et al. ........... 526/135 |
| 4,168,282 A | 9/1979 | Schneider ............... 585/361 |
| 4,320,239 A | 3/1982 | Schneider ............... 585/360 |
| 4,891,456 A | 1/1990 | Yuasa et al. ............ 585/275 |
| 5,093,441 A | 3/1992 | Sjardijn et al. ......... 526/126 |
| 5,248,745 A | 9/1993 | Sjardijn et al. ......... 526/126 |

FOREIGN PATENT DOCUMENTS

| JP | 57-154133 | 9/1982 |
| JP | 2-185520 | 7/1990 |
| JP | 2-255715 | 10/1990 |

(List continued on next page.)

OTHER PUBLICATIONS

The English translation of Japanese patent 7–173085.*

*Primary Examiner*—Thuan D. Dang
(74) *Attorney, Agent, or Firm*—Hollander Law Firm, P.L.C.

(57) ABSTRACT

The present invention is drawn to a tetracyclododecene composition having a regulated cyclopentadiene trimer content, whereby addition polymerization with the aid of a Ziegler catalyst can be carried out while preventing gelation caused by a cross-linking reaction. A tetracyclododecene composition regulated with respect to the content of a specific ingredient having a molecular weight of 188 is disclosed, whereby polymers having high glass transition temperatures can be obtained through various polymerizations. Further, the present invention is drawn to a method for producing tetracyclododecene in the presence of an aliphatic solvent having a boiling point close to that of norbornene, which solvent is effective in inhibiting the recovered norbornene from solidifying. Preferred for obtaining high purity tetracyclododecene by removing the methyltetrahydroindene contained in dicyclopentadiene feedstock is a continuous process comprising a combination of reaction, distillation, and recovery/circulation, and so forth.

21 Claims, 2 Drawing Sheets

FOREIGN PATENT DOCUMENTS

| | | | |
|---|---|---|---|
| JP | 03128333 A * | 5/1991 |
| JP | 5-112474 | 5/1993 |
| JP | 6-9437 | 1/1994 |
| JP | 6-72909 | 3/1994 |
| JP | 7-173085 | 7/1995 |
| JP | 7-252169 | 10/1995 |
| WO | WO 97/33848 | 9/1997 |

* cited by examiner

TETRACYCLODODECENE COMPOSITIONS AND PROCESS FOR PRODUCING THE SAME

TECHNICAL FIELD

The present invention relate tetracyclododecene composition having a regulated content of compounds, which cause undesirable influences when used in various polymerizations.

BACKGROUND ART

Polymers and copolymers of cycloolefin have been regarded as polymers excellent in optical properties, high transparency, thermal resistance and oil-absorbency, and the cycloolefin represented by tetracyclododecene is useful as a feedstock. This cycloolefin is used for polymerization with the aid of organometallic complex catalysts, and the polymerization processes are divided roughly into two categories. In the one process, homopolymerization or copolymerization with lower α-olefins at the olefin-site of said cycloolefin is carried out with Ziegler catalysts including metallocene catalysts. As the other process, metathesis polymerization with carbene-type complexes is known.

As processes for producing tetracyclododecene, the following are known. In U.S. Pat. No. 4,320,239, it is disclosed that norbornene is circulated in a process of heating α-olefin, cyclopentadiene and/or dicyclopentadiene and norbornene to produce a mixture containing norbornene and tetracyclododecene.

In Japanese Laid-Open Patent Publication No. H07-173085, a composition of tetracyclododecene derivative is disclosed, which composition contains 50~5,000 ppm of the compound shown in the following formula [II], namely a trimer of cyclopentadiene. In this Publication, it is disclosed that the obtained composition of tetracyclododecene derivative can be used as a monomer for ring opening metathesis polymerization. However, no process for producing the compound is specifically disclosed.

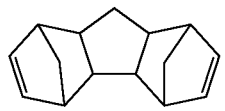

[II]

A product compound obtained from ethylene, cyclopentadiene and/or dicyclopentadiene and norbornene by Diels-Alder thermal addition reaction contains sometimes trimers of cyclopentadiene or the like, other than tetracyclododecene as an intended product and norbornene as an intermediate product. Because trimers of cyclopentadiene have boiling points close to that of tetracyclododecene as intended product, the formers are liable to get mixed in tetracyclododecene during distillation to obtain tetracyclododecene. As trimers of cyclopentadiene, there are a diolefin compound shown in the following formula [III] having the olefin structures both of norbornene-type and cyclopentene-type, and a diolefin compound shown in said formula [II] having two sets of norbornene-type olefin structure. In addition polymerization with a Ziegler catalyst, all of these diolefin compounds cause sometimes cross-linking reactions in homopolymerization or in copolymerization with lower α-olefins at the olefin-site of cycloolefins, and further cause gelling.

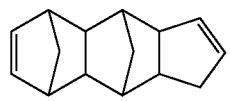

[III]

Further, when tetracyclododecene is synthesized with a feedstock comprising ethylene, cyclopentadiene and/or dicyclopentadiene and norbornene, the product contains a hydrocarbon compound having a molecular weight of 188 besides tetracyclododecene. It was found out that the presence of this compound lowers a glass transition temperature of the polymer obtained in said metathesis polymerization or the like of tetracyclododecene, while its optical properties are satisfactory. The hydrocarbon compound having a molecular weight of 188 has a boiling point so close to that of tetracyclododecene, that the former is liable to get mixed in tetracyclododecene during distillation to obtain tetracyclododecene.

Next, problems concerning the process for producing tetracyclododecene will be explained.

In Japanese Laid-Open Patent Publication No. H03-128333, a process for producing tetracyclododecene is disclosed, which comprises heating ethylene, cyclopentadiene (or dicyclopentadiene) and norbornene in the presence of an aromatic solvent. And it is mentioned that solvents such as benzene and alkylbenzene, preferably toluene, are used as aromatic solvents in order to restrain norbornene from solidifying.

According to said production process, ethylene, cyclopentadiene (or dicyclopentadiene) and norbornene are heated for reaction to obtain a mixture of norbornene and tetracyclododecene, and the produced norbornene is reused by circulating. Here, when being reused by circulating, norbornene is usually separated and recovered from a reaction mixture by distillation. However, norbornene is liable to solidify by cooling after distilled out of a distillation tower, as indicated in said Publication.

Although the recovered norbornene solidifies probably after distilled out of a distillation tower as mentioned above, the solidifying can be avoided by use of a solvent. However, when the boiling point of a solvent is exceedingly apart from that of norbornene, the concentration of the solvent in the distilled norbornene is sometimes very low. In that case, even if a solvent is used, norbornene can not be prevented from solidifying.

For example, toluene, which is especially favorable in the aromatic solvents described in said Publication has the boiling point of about 111° C. rather different from that of norbornene of 95° C. As a result of the difference in boiling points as mentioned above, the concentration of norbornene in a distillate containing norbornene increases (the concentration of toluene decreases), under certain conditions of distillation for recovering norbornene, and norbornene is very likely to solidify.

Furthermore, environmental problems and the influences on human body have been recently becoming the center of interest. From the viewpoint of this situation, use of aromatic compounds such as toluene has been avoided, that is, aromatic hydrocarbon solvents such as benzene, toluene and xylene are toxic to human body. For example, in the ordinance on the prevention of organic solvent poisoning, organic solvents containing more than 1 volume % of benzene are classified as the specified group-2 substance, and the dealing procedure is strictly regulated.

Processes for producing tetracyclododecene while recovering and circulating the produced norbornene are disclosed in Japanese Laid-Open Patent Publication Nos. H06-9437 and No. H06-72909 as well as said Japanese Laid-Open Patent Publication No. H03-128333. In all of these, the recovered and circulated norbornene contains dicyclopentadiene. Further, dicyclopentadiene is used as a feedstock in all of these, and commercially available dicyclopentadiene often contains methyltetrahydroindene (MTHI) as an impurity due to the fact that the starting material is a thermally cracked oil from naphtha or the like.

When MTHI contained as an impurity in commercially available dicyclopentadiene is mixed in the recovered and circulated norbornene, MTHI having the high decomposition temperature is liable to accumulate in a reaction system, and as a result, other by-products are also produced in great quantities. Though impurities other than MTHI are also contained in dicyclopentadiene, they are different from MTHI in that they decompose thermally at lower temperatures. Further, even if MTHI is decomposed by the increase of reaction temperature in a reaction system, the yield of the intended product decreases and other by-products are also produced, which both are not desirable.

In view of the circumstances as mentioned above, objects of the present invention are as follows. The one is to present tetracyclododecene compositions, which do not cause gelling due to cross-linking reaction in the case of homopolymerization or copolymerization with lower α-olefins at the olefin-site of cycloolefins in addition polymerization with a Ziegler catalyst, or which do not decrease glass transition temperatures of the polymers obtained in metathesis reaction or the like. The other is to present a method for producing a tetracyclododecene composition efficiently, by preventing solidification of norbornene distilled out in the process of production and by removing impurities such as MTHI from norbornene.

DISCLOSURE OF INVENTION

Figure 1:
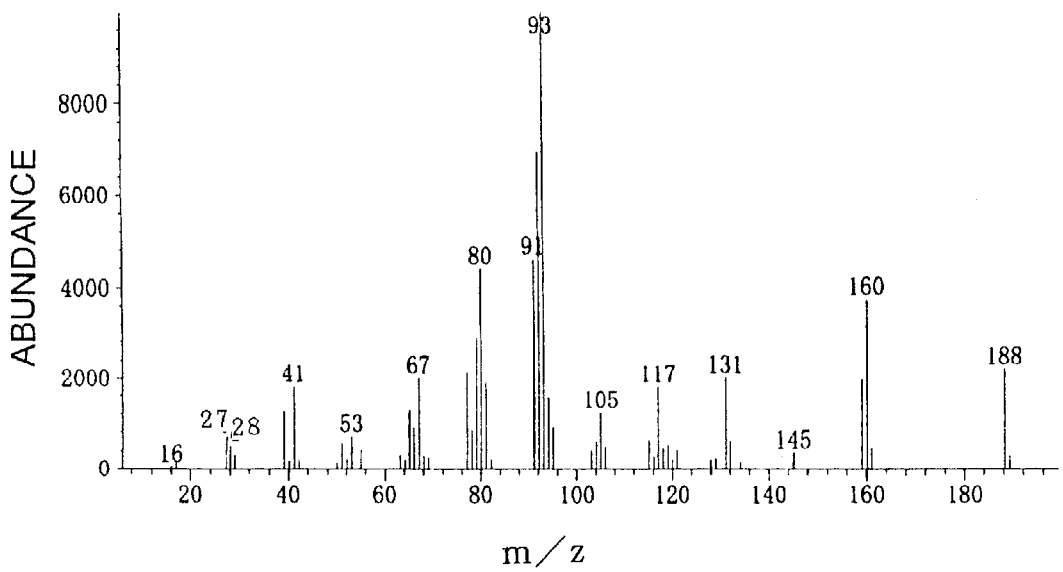
FIG. 1 is a chart of gas chromatography-mass spectrometry on the hydrocarbon having a molecular weight of 188.

The primary feature of the present invention relates to a tetracyclo-dodecene composition used for polymerization, comprising tetracyclododecene shown in the following formula [I], characterized in that a content of impurity is regulated in order to reduce harmful influences in use for polymerization.

[I]

The second feature of the present invention is a tetracyclododecene composition described in the first, which contains 100~5,000 ppm of trimers of cyclopentadiene as the impurity and is used for addition polymerization with a Ziegler catalysts.

The third feature of the present invention is a tetracyclododecene composition described in the second, wherein the trimer of cyclopentadiene is shown in the following formula [II] and its content is 10~3,000 ppm.

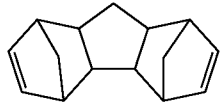

[II]

The fourth feature of the present invention is a tetracyclododecene composition described in the first, which contains 1~70,000 ppm of a hydrocarbon containing only one carbon-carbon double bond as the impurity and having a molecular weight of 188.

The fifth feature of the present invention is a process for producing a tetracyclododecene composition, which process comprises mixing ethylene, cyclopentadiene and/or dicyclopentadiene and norbornene, and heating for a reaction.

The sixth feature of the present invention is a process for producing a tetracyclododecene composition described in the fifth, which process comprises adjusting the molar ratio of cyclopentadiene and/or dicyclopentadiene regarded as cyclopentadiene against norbornene to 0.1~0.6, and adjusting the molar ratio of ethylene to norbornene to 0.05~0.3.

The seventh feature of the present invention is a process for producing a tetracyclododecene composition described in the fifth, which process comprises adjusting the weight ratio of cyclopentadiene and/or dicyclopentadiene regarded as cyclopentadiene against the sum total of ethylene, cyclopentadiene and/or dicyclopentadiene and norbornene to 0.06~0.30.

The eighth feature of the present invention is a process for producing a tetracyclododecene composition described in the fifth, which process comprises using an inactive hydrocarbon solvent during a reaction.

The ninth feature of the present invention is a process for producing a tetracyclododecene composition described in the eighth; wherein the hydrocarbon solvent is a branched aliphatic hydrocarbon or an alicyclic hydrocarbon.

The tenth feature of the present invention is a process for producing a tetracyclododecene composition described in the eighth, which process comprises the following process steps (1)~(3):

(1) the step of heating ethylene, cyclopentadiene and/or dicyclopentadiene and-norbornene in the presence of an aliphatic solvent, whose boiling point at atmospheric pressure is in the range of the boiling point of norbornene at atmospheric pressure ±10° C., thereby producing a reaction mixture containing at least norbornene, tetracyclododecene and the aliphatic solvent, (2) the step of recovering a mixture composed of at least norbornene and said aliphatic solvent from said reaction mixture by means of distillation, and circulating the mixture to said step (1), and (3) the step of separating and recovering tetracyclododecene from the reaction mixture taken out of said step (2).

The eleventh feature of the present invention is a process for producing continuously a tetracyclododecene composition described in the fifth, which process comprises the following steps (1)~(5):

(1) the step of supplying ethylene, cyclopentadiene and/or dicyclopentadiene and norbornene to a reactor and carrying out a reaction to produce a reaction mixture containing at least tetracyclododecene, norbornene and methyltetrahydroindene, (2) the step of separating and removing ethylene from said reaction mixture, (3) the step of separating and recovering the norbornene which does not contain substantially methyltetrahydroindene, from the reaction mixture taken out of said step (2), (4) the step of circulating at least a part of norbornene separated and recovered in said step (3) to said reactor, and (5) the step of separating and recovering tetracyclododecene from the reaction mixture taken out of said step (3).

The twelfth feature of the present invention is a process for producing continuously a tetracyclododecene composition described in the fifth, which process comprises the following steps (1)~(5):

(1) the step of supplying ethylene, cyclopentadiene and/or dicyclopentadiene, norbornene and a solvent to a reactor and carrying out a reaction to produce a reaction mixture containing at least tetracyclododecene, norbornene and methyltetrahydroindene, (2) the step of separating and removing ethylene from said reaction mixture, (3) the step of separating and recovering a mixture of norbornene and a solvent, which does not contain substantially methyltetrahydroindene, from the reaction mixture taken out of said step (2), (4) the step of circulating at least a part of the mixture of norbornene and a solvent, which is separated in said step (3), to said reactor, (5) the step of separating and recovering tetracyclododecene from the reaction mixture taken out of said step (3).

In the following, the present invention will be described in detail.

Tetracyclododecene is usually synthesized from norbornene and cyclopentadiene by Diels-Alder reaction. Because norbornene can be synthesized from ethylene and cyclopentadiene by Diels-Alder reaction, norbornene can be synthesized in the presence of ethylene under the reaction conditions for synthesizing tetracyclododecene from norbornene and cyclopentadiene, that is, by heating and mixing cyclopentadiene and norbornene in the presence of ethylene. By this method, tetracyclododecene can be synthesized at the same time as norbornene. Therefore, if the norbornene produced is circulated for reuse, fresh supply of norbornene appears to be dispensable. By the way, said U.S. Pat. No. 4,320,239 discloses a process like this in the presence of α-olefins such as propylene or the like.

Cyclopentadiene is often purchased commercially as a dimer, namely dicyclopentadiene. Cyclopentadiene is easily obtained by decomposing dicyclopentadiene thermally. Therefore, when tetracyclododecene is synthesized by Diels-Alder reaction at the temperature above that of thermal decomposition of dicyclopentadiene, dicyclopentadiene can be used as a feedstock. An appropriate mixture of dicyclopentadiene and cyclopentadiene can be also used as a feedstock.

Cyclopentadiene, which is contained in $C_5$-fraction obtained by cracking of naphtha, kerosene, light oil or the like, can be dimerized into dicyclopentadiene, separated and refined. In this case, cyclopentadiene is dimerized with $C_5$~$C_6$ branched or cyclic diolefins, and these products exist as impurities in dicyclopentadiene. The other compounds such as methyltetrahydroindene are also contained as impurities.

Ethylene is obtained by steam-cracking of naphtha, natural gas or gas fraction generated from petroleum refining, such ethylene is called as polymer grade ethylene. Besides the above, ethylene obtained by dehydrogenating ethane or by dehydrating ethanol can be also utilized. However, polymer grade ethylene is desirable.

Norbornene is synthesized also in the same condition as that for synthesizing tertracyclododecene in the coexistence of ethylene with dicyclopentadiene, cyclopentadiene or a mixture thereof. Norbornene to be supplied at the initial stage of reaction can be synthesized, for example, by utilizing ethylene and cyclopentadiene or dicyclopentadiene as feedstocks under the conditions of reaction temperature of 100~350° C. and reaction pressure of 0.1~40 MPa.

Norbornene is difficult to obtain commercially. Accordingly, the reaction is conducted in the manner that the quantity of norbornene after the reaction will be larger or at least not smaller than before, and norbornene in a reaction mixture is recovered and reused. The method is preferable because the amount of fresh supply of expensive norbornene can be restricted to a minimum. Besides, both at the beginning of reaction and during the reaction, the purity of norbornene is desired to be 95% or more, preferably 98% or more, further preferably 99.5% or more.

Reaction temperature can be selected from the range of 130~350° C. In particular when dicyclopentadiene is utilized as a feedstock, the reaction temperature is required to be in the range of 150~350° C., preferably 150–300° C. in order to decompose dicyclopentadiene into cyclopentadiene.

Then, the residence time during which a feed mixture is subjected to a continuous reaction is 0.1~4 hours, preferably 0.1~3.5 hours, further preferably 0.1~3 hours. If the residence time is less than 0.1 hour, the quantity of unchanged materials will increase unfavorably.

Reaction pressure is selected from the range of atmospheric pressure to 20 MPa, preferably 1.0~20 MPa.

Reactions can be carried out arbitrarily in these ranges of reaction conditions. Ethylene is preferably liquefied in a reaction system. The condition under which ethylene can exist in a liquid state in a reaction system varies depending on the feed ratio among norbornene, cyclopentadiene and/or dicyclopentadiene and ethylene. For example, when the molar ratio of norbornene/dicyclopentadiene/ethylene is 8/1/1 and the temperature is 180° C., a pressure of about 2.5 MPa or more is required. When the quantity of ethylene is greater than the above, the higher pressure is required according as temperature becomes higher; for example, a pressure of about 3.9 MPa or more is necessary at 260° C.

The operation of reaction and refining by distillation in the present invention can be carried out with either batch type or continuous flow type. However, it is preferable industrially to select the continuous flow type.

When tetracyclododecene is synthesized from feedstocks of norbornene, cyclopentadiene and/or dicyclopentadiene and ethylene, cyclopentadiene and/or dicyclopentadiene are introduced in a reactor by a booster or a pump. Norbornene as the other feedstock may be previously mixed with cyclopentadiene and/or dicyclopentadiene, though it may be also separately supplied.

Any type of reactor may be employed, complete mixing type or piston-flow type. The reactors of piston-flow type are sold on the market such as "Static Mixer" manufactured by NORITAKE CO., LTD, "SULZER Mixer" manufactured by SUMITOMO HEAVY IND., LTD. and "SQUARE Mixer manufactured by SAKURA SEISAKUSHO LTD. and the like. With whichever type of complete mixing or piston-flow, it is desirable for feedstocks to be mixed homogeneously. Each type can be employed singly or in combination with the other.

The reaction can be carried out in one-stage or multiple-stage. With a multiple-stage, any type of reactor comprising single or combined type of complete mixing and piston-flow can be employed in series or parallel combination.

The reaction mixture taken out of a reactor is introduced to a refining step, where a tetracyclododecene composition is obtained after refining. Distillation is preferably employed for refining, and both of batch type and continuous type may be used. However, continuous distillation is preferable commercially. Because tetracyclododecene is likely to undergo thermal decomposition at a higher temperature, it is preferable to prevent the tetracyclododecene from decomposition in a distillation tower.

In producing the present compositions, antioxidants, polymerization inhibitors and the like can be added appropriately to a reaction system. For example, phenol compounds such as hydroquinone, 2,6-di-tert-butyl phenol, 2,6-di-tert-butyl-p-cresol and 4-methoxyphenol, hydroxylamine compounds such as N,N-dimethylhydroxylamine and N,N-diethylhydroxylamine are added favorably. The amount to be added is usually in the range of 10~10,000 ppm, preferably 50~5,000 ppm, against the total amount of feedstocks supplied to a reactor. They can be also added to tetracyclododecene as product similarly.

Next, tetracyclododecene compositions used for addition polymerization with Ziegler catalysts will be explained.

The present tetracyclododecene composition used for this object contains 100~5,000 ppm of trimers of cyclopentadiene, preferably 100~4,000 ppm, further preferably 100~3,000 ppm. The content of the trimer of cyclopentadiene having the structure shown in said formula [II] is in the range of 100~3,000 ppm, preferably 100~2,500 ppm, further preferably 100~2,000 ppm. If the amount of trimers of cyclopentadiene exceeds the upper limit of the range, they cause sometimes cross-linking rection in homopolymerization or copolymerization with lower α-olefins at the olefin-site of cycloolefins in addition polymerization with a Ziegler catalyst. Then, a polydisperse structure becomes remarkable and finally may cause unfavorable gelation. On the other hand, if the content of trimers of cyclopentadiene is made less than said lower limit, a burden is imposed on distillation refining. That is, it is necessary to increase the number of plates, the amount of reflux and the like of a distillation tower, which are unfavorable economically.

In producing said tetracyclododecene composition, when the reaction is carried out by supplying ethylene, cyclopentadiene and/or dicyclopentadiene and norbornene to a reactor, the molar ratios among said components are as follows. Taking mole of norbornene to be 1.0, cyclopentadiene and/or dicyclopentadiene regarded as cyclopentadiene is in the range of 0.1~0.6, preferably 0.1~0.5, further preferably 0.1~0.4, and ethylene is in the range of 0.05~0.3, preferably 0.05~0.25, further preferably 0.05~0.2. If the amount of norbornene is too large, the yield of high-boiling compounds in a reaction liquid becomes smaller. However, the circulating amount of norbornene increases unprofitably. On the other hand, if the amount of norbornene is too small, high-boiling compounds of trimers of cyclopentadiene are produced as by-product in large quantity, so that a burden is imposed unfavorably on distillation refining of tetra cyclododecene.

Furthermore, for keeping the content of trimers of cyclopentadiene in the range of 100~5,000 ppm, it is important to carry out the reaction while controlling the weight ratio of cyclopentadiene and/or dicyclopentadiene regarded as cyclopentadiene against the sum total of ethylene, cyclopentadiene and/or dicyclopentadiene and norbornene. The weight ratio is in the range of 0.06~0.3, preferably 0.1~0.25, further preferably 0.1~0.2. If the weight ratio of cyclopentadiene and/or dicyclopentadiene is higher than the upper limit, trimers of cyclopentadiene as by-product are produced in considerably larger amount against the tetracyclododecene produced, thereby decreasing the effective utilization of feedstock. On the other hand, if the weight ratio of cyclopentadiene and/or dicyclopentadiene is lower than the lower limit, the yield of tetracyclododecene decreases. By limiting the weight ratio of cyclopentadiene and dicyclopentadiene against the sum total of feed stocks within this range, feedstock can be consumed efficiently. As a result, the production of trimers of cyclopentadiene as by-product is prevented, and tetracyclododecene compositions of high purity can be obtained.

A tetracyclododecene composition produced as mentioned above can be used for addition polymerization with a Ziegler catalyst.

As addition polymerizations with a Ziegler catalyst, there are homopolymerization and copolymerization with other olefins such as lower α-olefins at the olefin-site (the site of olefinic carbon-carbon double bond) of tetracyclododecene.

Ziegler catalyst is defined in the widest sense as a transition metal compound having metal-carbon bonds that can accept olefin units repeatedly. Usually, the catalyst consists of two components; the one is a transition metal salt or its complex, especially halogen compounds in many cases, and the other is a typical metal alkyl compound (regarded as an activator) that can form active metal-carbon bonds. What is called metallocene-type catalyst is included among these. Polymerization with a Ziegler catalyst is an addition polymerization type. Addition polymerization is a simple addition reaction of unsaturated compounds such as olefins, as mentioned above, and is usually accompanied neither by cleavage of olefinic carbon-carbon double bonds, nor by ring opening reaction. Therefore, the obtained polymer hardly contain carbon-carbon unsaturated bonds, and if any, only one carbon-carbon double bond at the end of molecule.

As Ziegler catalysts in a narrow sense are used compounds of titanium, vanadium and the like. For example, as disclosed in Japanese Laid-Open Patent Publication No. H09-176396, European Patent No.0 203 799 A and the like, α-olefins such as ethylene and tetracyclo-dodecene can be copolymerized with the aid of a catalyst consisting of vanadium compound and organoaluminum compound which are soluble in hydrocarbon solvents.

Ziegler catalysts in a wide sense include what is called metallocene-type catalyst, which utilizes bent metallocene in the group IV, such as Zr, Hf and Ti, and usually an organoaluminum compound as co-catalyst (activator). More concrete examples using metallocene catalysts are disclosed in U.S. Pat. No. 5,087,677, Japanese Laid-Open Patent Publication No. H02-173112, U.S. Pat. No. 5,344,900, European Patent No. 0 283 164 A and Japanese Laid-Open Patent Publication No. S61-221206. For example, there is disclosed a process using catalysts consisting of the components: (a) compounds comprised of transition metals in the group IVB, VB or VIB of the periodic table, such as Zr, Hf and Ti, and (b) organoaluminum oxy-compounds.

Exemplified as (a) the components of transition metal compounds are complex compounds, having at least two of cycloalkadienyl groups or substituted products thereof, or made by combining the cycloalkadienyl groups or substituted products thereof through hydrocarbon group, silylene group or substituted silylene group, the so-called multidentate ligands.

(b) The organoaluminum oxy-compound is shown in the following formula [IV] or [V]. In the formula, each of R is an independent hydrocarbon group, specifically methyl, ethyl, propyl, butyl or the like, and m is an integer of 2 or more, preferably from 2 to 100.

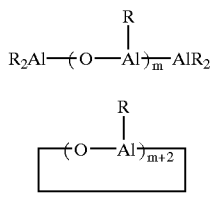

When tetracyclododecene is polymerized in the present invention, it can be copolymerized with other kinds of olefinic compound, such as ethylene, propylene or the like. For example, as disclosed in U.S. Pat. No. 5,191,026, the balance among various properties can be adjusted by changing the extent of copolymerization.

Next, said tetracyclododecene composition containing 1~70,000 ppm of the hydrocarbon having a molecular weight of 188 will be explained.

The hydrocarbon compound having a molecular weight of 188 is produced as a by-product, when ethylene exists in a substantial amount in a reaction system. Thus, when norbornene, cyclopentadiene and/or dicyclopentadiene and ethylene are supplied to a reaction system and subjected to reaction by heating, it is naturally formed as mentioned above. Otherwise, norbornene and cyclopentadiene are supplied without supplying ethylene separately and subjected to reaction by heating to produce tetracyclododecene. In this case, said hydrocarbon having a molecular weight of 188 is produced as well, if norbornene is decomposed into ethylene and cyclopentadiene in a reaction system, so that ethylene exists substantially in the reaction system.

The formation of the hydrocarbon compound having a molecular weight of 188 is not always due to impurities in feedstock judging from the molecular weight. Accordingly, there is not a direct correlation between the amount of impurities in feedstock and the amount of the hydrocarbon having a molecular weight of 188 in tetracyclododecene. However, under certain conditions of reactions or the following distillations, the content of said hydrocarbon having a molecular weight of 188 can be decreased by improving the purity of feedstock, especially that of dicyclopentadiene.

As to the hydrocarbon compound having a molecular weight of 188, the molecular weight was confirmed to be 188 by measuring with a gas chromatography-mass spectrometer. That is, the hydrocarbon compound having a molecular weight of 188 represents a molecular ion peak having a mass/charge (m/z) of 188 when mass spectrometry of low resolution is carried out by an electron shock method.

Further, by measuring with a gas chromatography-infrared spectro-photometer, said compound was confirmed as a hydrocarbon compound having only one non-conjugated carbon-carbon double bond. Since this hydrocarbon compound having a molecular weight of 188 has a carbon-carbon double bond, it is an unsaturated hydrocarbon ($C_{14}H_{20}$) that can be polymerized like tetracyclo-dodecene.

Figure 2:
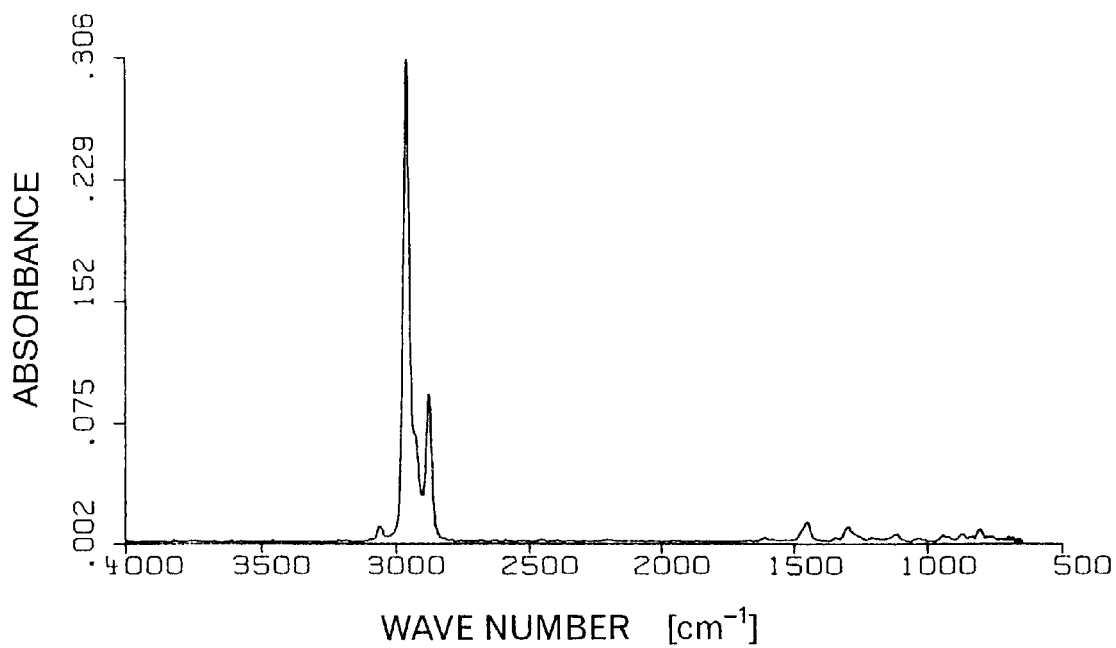
FIG. 2 is a chart of gas chromatography-infrared spectrophotometry on the same.

Concerning said hydrocarbon having a molecular weight of 188, a result of measurement with gas chromatography (GC)-mass spectrometry is shown in FIG. 1, and the one with GC-infrared spectrophotometry is shown in FIG. 2.

At this point, methods for carrying out GC-mass spectrometry and GC-infrared spectrophotometry will be explained.

(1) GC-Mass Spectrometry

A M-80 type double-convergent GC-mass spectrometer manufactured by Hitachi, Ltd. is connected with a 5890 type gas chromatography manufactured by Hewlett-Packard to be employed for measurement.

Mass spectrometry is carried out by an electron shock method under the conditions comprising temperature of ionization chamber 200° C., ionization potential 70 eV, ion acceleration voltage 3 kV and electric current of ion source filament 3.4 A. Perfluorokerosene (PFK) is utilized as a marker, and a mass spectrum is obtained by comparing the result with the fragment ion of PFK. With this procedure, the mass can be obtained directly as an integer.

In the part of gas chromatography, a TC-1 capillary column manufactured by GL Science (inner diameter: 0.25 mm, film thickness: 0.25 μm, length: 60 m) is used, and the column oven is heated from the stating temperature of 60° C. up to 250° C. at an increasing rate of 5° C./min.

(2) GC-Infrared Spectrophotometry

A Fourier transform infrared spectrophotometer, type 710 made by Nicolet Japan with a type 5890 gas chromatograph manufactured by Hewlett- Packard is employed for measurement. The temperatures at the column and the oven used in the gas chromatography are the same as those in the gas chromatography-mass spectrometry.

The tetracyclododecene composition synthesized as mentioned above is separated and refined by distillation. The content of the hydrocarbon compound having a molecular weight of 188 in the present invention is 1~70,000 ppm. If the tetracyclododecene containing more than 70,000 ppm is polymerized, the polymer obtained is found out to have substantially low glass transition temperature. In order to reduce the content of said hydrocarbon compound having a molecular weight of 188 less than 1 ppm, refining means such as separation by crystallizing, separation by chromatography and rectification are required, which is unprofitable commercially. The content of the hydrocarbon compound having a molecular weight of 188 is preferably 10~50,000 ppm, further preferably 100~30,000 ppm.

The formation of the hydrocarbon compound having a molecular weight of 188 in the present invention is, as mentioned above, related to the presence of ethylene in a reaction system. Therefore, it is possible to control the amount of said hydrocarbon by decreasing the amount of ethylene in a reaction system. Specifically, cyclopentadiene and/or dicyclopentadiene and ethylene are supplied to a reaction system so that the ratio of the mole of ethylene against the mole of cyclopentadiene and/or dicyclopentadiene regarded as cyclopentadiene can be kept 2 or less. Further, the reaction temperature is adjusted to 300° C. or less, and the reaction time is restricted to 4 hours or less. Under these conditions, the content of said hydrocarbon having a molecular weight of 188 can be restricted within said range.

The tetracyclododecene compositions, produced as mentioned above, containing 1~70,000 ppm of the hydrocarbon compound having a molecular weight of 188 can be supplied for polymerization according to conventional methods.

In carrying out metathesis polymerization, processes disclosed in the following can be used: Japanese Laid-Open Patent Publication Nos. H09-183832 and H08-151435, U.S. Pat. Nos. 5,462,995 and 5,580,934, and Japanese Laid-Open Patent Publication Nos. H01-168725, H01-168724 and S60-26024. Specifically, there is a process utilizing catalyst composed of (a) catalyst components of transition metal compounds and (b) co-catalyst components of metal compounds.

(a) Catalyst components of transition metal compounds are compounds of transition metal in the group IVB, VB, VIB, IIVB or VIII of the periodic table. Exemplified as the compounds are halide, oxyhalide, alkoxyhalide, alkoxide, carboxylic acid salt, acetylacetonate, oxyacetylacetonate, carbonyl complex, acetonitrile complex and hydride complex of transition metals, the derivatives thereof, and the complexes composed of phosphine compounds thereof and complexing agents.

(b) Co-catalyst components of metal compounds are organic compounds containing metals of the group I, IIA, IIB, IIIA or IVA of the periodic table and having at least one metal element-carbon bond or metal element-hydrogen bond. Exemplified as the compounds, are organic compounds of Al, Sn, Li, Na, Mg, Zn, Cd, B and the like.

Further, in order to improve the metathesis polymerization activity, the following compounds can be added to the components of (a) and (b). That is, aliphatic tertiary amines, aromatic tertiary amines, molecular oxygen, alcohols, ethers, peroxides, carboxylic acids, acid anhydrides, acid chlorides, esters, ketones, nitrogen-containing compounds, sulfur-containing compounds, halogen-containing compounds, molecular iodine, the other Lewis acids and the like.

On the other hand, homopolymerization or copolymerization with lower α-olefins can be carried out at the olefin-site of tetracyclododecene with the aid of Ziegler catalysts including metallocene catalyst. Metallocene catalyst is the same as described previously as the catalyst that is used for addition polymerization of tetracyclododecene containing 100~5,000 ppm of trimers of cyclopentadiene.

Incidentally, polymers obtained by ring opening reaction sometimes contain unsaturated bonds. When the thermal resistance or the light resistance is low owing to that, a part or all of unsaturated bonds can be hydrogenated to improve the properties. Hydrogenation can be carried out with the aid of catalysts comprising noble metals such as nickel, palladium and platinum, which metals are carried on inorganic carriers in dispersion. Further, homogeneous hydrogenating catalysts can be also utilized. As the conditions of hydrogenation, the range of pressure is 0.1~20 MPa, and that of temperature is 0~200° C.

Next, a process for producing tetracyclododecene will be explained, which employs solvents for preventing norbornene from solidifying.

As mentioned above, norbornene is separated and recovered from a reaction mixture, then reused by circulating. Therefore, it is likely to solidify at the time when it is cooled and liquefied after taken out of a distillation tower. At this point, if the boiling point of a solvent is extremely different from that of norbornene, the solvent is likely to be distilled out separately from norbornene. Under these conditions, added solvents cannot function sufficiently.

From this viewpoint, solvents having the boiling points at atmospheric pressure close to that of norbornene are used in the present invention. Specifically, aliphatic hydrocarbons having the boiling points at atmospheric pressure within the range of the boiling point of norbornene at atmospheric pressure ±10° C., preferably ±5° C., are used as reaction solvents. In particular, branched aliphatic or alicyclic hydrocarbons are preferable owing to the excellent safety for environment and human body and have the excellent solubility.

Specifically, there are ethylcyclopentane, dimethylcyclopentane, 2-methylhexane, 3-methylhexane, 3-ethylpentane, 2,3-dimethylpentane, 3,3-dimethylpentane, 2,2,3-trimethylpentane, 2,2,4-trimethylpentane, alkylate gasoline and the like. Alkylate gasoline mentioned above is a mixture consisting mainly of trimethylpentane, which is produced by alkylating isobutane with butene with the aid of strong acids or super strong acids as catalysts, such as zirconia sulfate, sulfuric acid and hydrogen fluoride.

As mentioned above, preferable solvents are branched aliphatic hydrocarbons, or alicyclic hydrocarbons consisting of saturated hydrocarbon ring, such as alicyclic hydrocarbon having pentane ring, that have boiling points very close to that of norbornene and contain the number of carbon atoms of 7~8. Specifically, ethylcyclopentane (boiling point 103° C.), dimethylcyclopentane (boiling point 99° C.), 2,2,4-trimethylpentane (boiling point 100° C.) and the like are particularly preferable. By the way, the yield of tetracyclododecene is also improved by using solvents.

Ethylene, cyclopentadiene or dicyclopentadiene, and norbornene are supplied to a reactor together with said aliphatic solvent, and subjected to reaction, then a reaction mixture is taken out of a reactor. The reaction mixture contains at least norbornene, a solvent and tetracyclododecene, and unchanged reactants as well. The reaction mixture taken out is introduced into a distillation step. Distillation can be carried out in batch type or continuous type. In every case, norbornene is recovered as a fraction consisting mainly of norbornene, mainly of norbornene and dicyclopentadiene, mainly of cyclopentadiene and norbornene, or mainly of cyclopentadiene, norbornene and dicyclopentadiene.

Because a reaction mixture of the present invention contains an aliphatic hydrocarbon solvent, norbornene is accompanied by a substantial amount of aliphatic hydrocarbon solvent in any of said fractions. Therefore, without any heating means such as warm water, norbornene can be prevented from solidifying in a storage tank of norbornene, distillation apparatuses and the pipes accompanying them.

The above fractions containing norbornene are further fractionated appropriately as occasion demands, and the separated and recovered norbornene is circulated into the reaction system, if necessary through a storage tank. Usually, it is circulated as a mixture containing a solvent.

Next, a process for producing tetracyclododecene of a high purity, which does not contain MTHI, will be explained on reference to a process flow diagram. The matters mentioned before will be repeated to facilitate the understanding of the flow.

Figure 3:
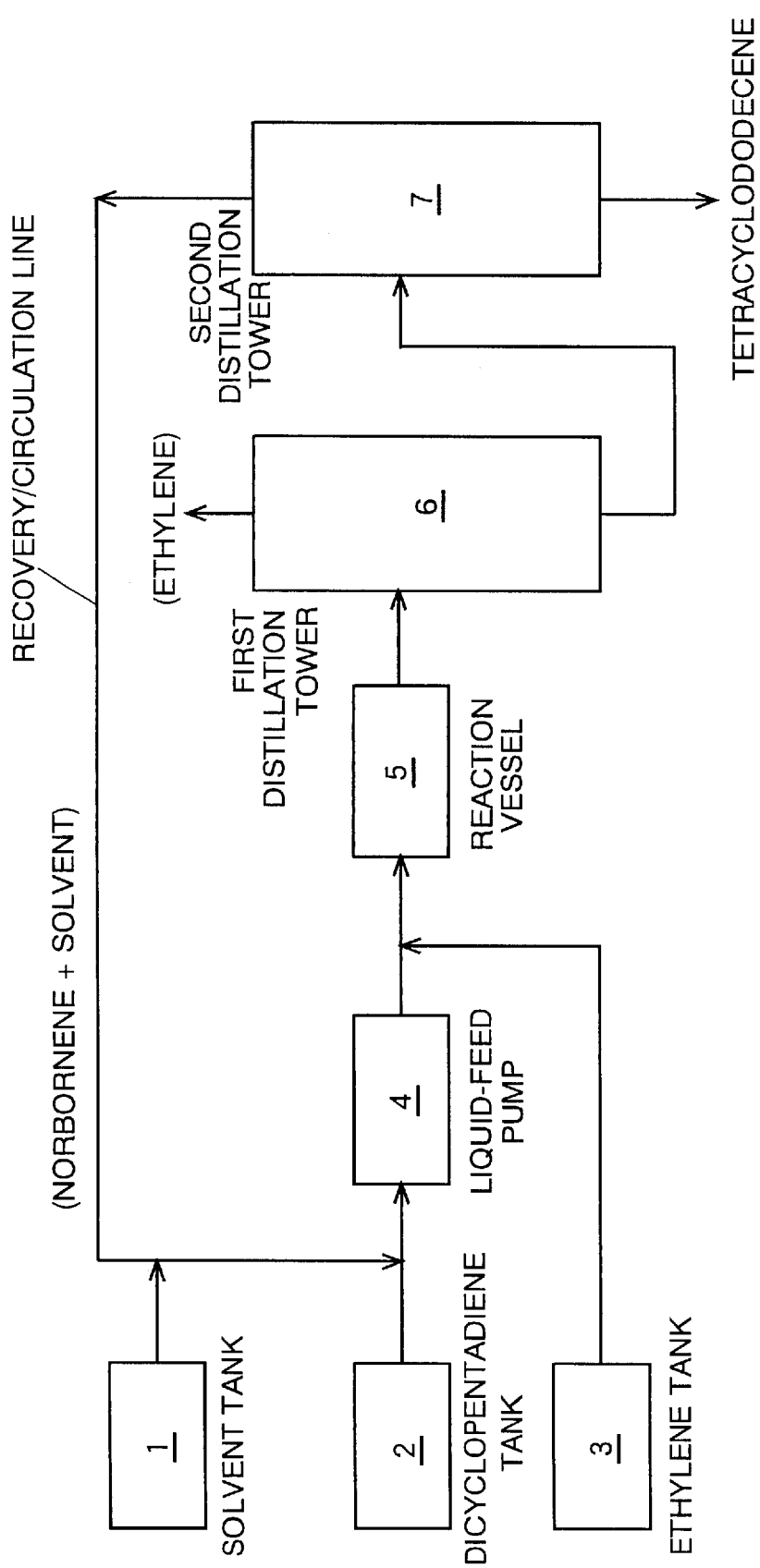
FIG. 3 is a process flow diagram showing an example of the modes of the present invention.

FIG. 3 is a process flow diagram showing an example of the modes of the present invention. In FIG. 3, a feed line of norbornene used at the beginning of reaction is omitted.

In FIG. 3, the symbol 1 represents a solvent tank. In the present method, it is preferable to use a solvent. The objects thereof are to reduce a concentration of each component, thereby decreasing the amount of high-boiling compounds as by-products and preventing the recovered norbornene from solidifying.

In FIG. 3, the symbol 2 represents a tank of dicyclopentadiene (abbreviated as "DCPD" hereafter). Cyclopentadiene (abbreviated as "CPD" hereafter) being used in the present invention is preferably prepared in advance by thermal decomposition of DCPD and distillation. CPD is obtained by thermal decomposition of DCPD easily, and DCPD is decomposed into CPD under the usual reaction conditions of the present invention. Moreover, DCPD is easy to obtain industrially. Therefore, in the present invention, DCPD is preferably utilized as a feedstock.

In the present invention, DCPD that is recovered from the thermally cracked oil of naphtha or the like is desirable, because it is available in large quantities industrially and at a low price. However, DCPD as above on the market often contains impurities including MTHI.

In FIG. 3, the symbol 3 represents a tank of ethylene. A feedstock for ethylene is not particularly limited. Ethylene can be utilized, which is obtained by steam-cracking of naphtha, natural gas or gas fraction generated from petroleum refining, which ethylene is called polymerization grade. Besides the above, ethylene obtained by dehydrogenating ethane or by dehydrating ethanol can be also utilized. However, ethylene of polymerization grade is desirable.

Norbornene can be synthesized from ethylene and CPD and/or DCPD as feedstocks under the conditions of reaction temperature 100~350° C. and reaction pressure 0.1~40 MPa. When ethylene and CPD and/or DCPD coexist in a reaction system as in the process of the present invention, norbornene can be also synthesized simultaneously under the conditions for synthesizing tetracyclo-dodecene. Norbornene is a compound being difficult to obtain industrially. Accordingly, in a production process of the present invention, the conditions will be selected so that the quantity of norbornene after the reaction will be larger or at least not smaller than before. By this method, continuous production of tetracyclododecene can be attained without fresh supply of norbornene in appearance.

CPD and/or DCPD are introduced into a reactor 5 with a transfer pump 4.

Ethylene is introduced into a reactor 5 with the aid of a pressure raised with a booster (not shown) or the like.

The number of mole of CPD and/or DCPD being supplied will be represented by the number of mole regarded as DCPD. Thus, a mixed liquid comprising 2 moles of CPD and 1 mole of DCPD is regarded as a liquid consisting of 2 moles of DCPD. In the present invention, the feed ratio (molar ratio) of norbornene/DCPD indicated as above is 1~1,000, preferably 2~100, further preferably 3~10. If the amount of norbornene is greater, the yield of high-boiling compounds in the reaction is relatively small. However, the circulating amount of norbornene increases and requires a lot of energy for distillation, which case is not so profitable. On the other hand, if the amount of CPD and/or DCPD is greater, a large quantity of high-boiling compounds is produced and reduces the coefficient of effective utilization of feedstock.

Using these feedstocks, tetracyclododecene is synthesized in a reactor 5. Reactor 5 can be in either type of complete mixing or piston-flow. Exemplified as reactors of piston-flow type are "Static Mixer" manufactured by NORITAKE CO., LTD, "SULZER Mixer" manufactured by SUMITOMO HEAVY IND., LTD. and "SQUARE Mixer" manufactured by SAKURA SEISAKUSHO LTD. Reactors can be used in one-stage or in multiple-stage, that is, 2 or more stage. A complete mixing type reactor and a piston-flow type one can be employed in series or parallel combination.

As a reaction condition in a reactor 5, space velocity is 0.001~100 h$^{-1}$, preferably 0.1~50 h$^{-1}$, further preferably 1~10 h$^{-1}$. If the space velocity is greater than 100 h$^{-1}$, the quantity of unchanged materials will increase unfavorably.

Reaction pressure is 0.1~50 MPa, preferably 0.5~40 MPa, further preferably 1~10 MPa.

Reaction temperature is 0~400° C., preferably 100~350° C., and further preferably 200~300° C. When DCPD is used as a feedstock, DCPD is easily decomposed into CPD preferably in a reaction temperature of 100° C. or higher.

In a process of the present invention, it is preferable that ethylene is fully dissolved in CPD and/or DCPD in a reactor 5. When a solvent is utilized, it is preferable that ethylene is also dissolved in the solvent. The conditions for dissolving vary depending on the molar ratio among norbornene, CPD and/or DCPD and ethylene. For example, without solvent, when the molar ratio of norbornene/DCPD/ethylene is 8/1/1 and the temperature is 180° C., a pressure of 2.5 MPa or higher is required. If the amount of ethylene is larger or temperature is higher than above, the higher pressure is necessary. For example, a pressure of about 3.9 MPa or higher is required at 260° C.

When a solvent is used, ethylene can be dissolved under lower pressures than above, and the lowering of reaction pressure can be attained. In any case, in order to obtain TCD with a high yield, it is preferable to carry out the reaction in a liquid phase, and to select the reaction conditions so that gaseous ethylene will not exist substantially in a reactor.

The reaction mixture continuously taken out of a reactor 5 is then sent to a distillation step.

In FIG. 3, the reaction mixture having left a reactor 5 is introduced into the first distillation tower 6, where the pressure is adjusted to 0.1~1 MPa. Here, the unchanged ethylene is separated mainly from a top of the tower. Distillation conditions at the top of the tower can be selected arbitrarily from the ranges of 100~1,000 kPa in pressure and 25~45° C. in temperature. The conditions in the bottom of the tower can be selected from the ranges of 100~1,000 kPa in pressure and 25~100° C. in temperature. The pressure is raised a little higher than atmospheric pressure, whereby the gas leaving the top of the tower can be condensed with cheap sea water or water for industrial use.

A mixed liquid, from which ethylene has been separated and removed, is taken out of the bottom of the tower of the first distillation tower 6. Then, it is introduced into the second distillation tower 7, from the top of which norbornene is recovered.

In the second distillation tower 7, distillation conditions are set so that the recovered norbornene will not substantially contain MTHI. Here, if MTHI is mixed in the recovered and reused norbornene, it accumulates in a reaction system, and further, probably causes high-boiling compounds to be formed, because MTHI is hardly decomposed owing to its high decomposition temperature.

By the way, MTHI is contained as an impurity in DCPD as a feedstock. Though impurities having the structures other than MTHI are also contained in DCPD, MTHI is likely to accumulate in a reaction system owing to its high decomposition temperature as mentioned above.

It is also possible to select the conditions so that the whole DCPD as a feedstock may be consumed. In this case, unchanged DCPD does not substantially exist in a reaction mixture. However, a little of unchanged DCPD exists sometimes in a reaction mixture depending on the reaction conditions. In these cases, DCPD may be often removed together with MTHI that is removed from the norbornene for circulating by distillation.

The conditions for distillation of the second distillation tower 7 are not particularly limited, and can be selected so that the recovered norbornene will not substantially contain MTHI. That is, the amount of MTHI in the recovered norbornene changes depending on the absolute and relative amount of MTHI in a feedstock of DCPD, the amount of norbornene synthesized and circulated, the amount of MTHI changed into high-boiling compounds and the relative amount thereof, and the like. However, it is usually preferable to set the conditions for distillation so that the amount of MTHI in the recovered norbornene is 700 ppm or less. MTHI that is separated from norbornene and remains in a reaction mixture is removed afterwards in a suitable refining step (not shown).

As specific conditions for distillation of the second distillation tower, the pressure at the top of the tower is 1~200 kPa, preferably 10~100 kPa, and the temperature there 35~96° C. Those in the bottom of the tower are 1~200 kPa, preferably 10~100 kPa, and 40~190° C., respectively. It is possible to pack a distillation tower with various types of packing and to use reflux, in order to increase the separation efficiency. The theoretical plate number of each distillation tower is 1~100, preferably 2~50, further preferably 3~30. Though the reflux ratio is determined judging from the separating conditions of each distillation tower, it is suitable to select from the range of 1~50.

As mentioned above, solvents are used preferably in the present invention for the reason of preventing the recovered norbornene from solidifying. Therefore, it is preferable to recover solvents at the same time that norbornene is recovered, that is, to recover a mixture of norbornene and solvents. Accordingly, after distilling the reaction mixture, a mixture of norbornene and the solvents are preferably circulated to a reactor 5 through a recovery/circulation line 8. Therefore, as solvents are preferably utilized organic solvents that can be distilled out together with norbornene, that is, having boiling points close to that of norbornene. Specifically, organic solvents having boiling points in the range of that of norbornene ±10° C., preferably that of norbornene ±5° C., are used.

TCD as a product is recovered from the reaction mixture taken out of the bottom of the second distillation tower 7 by suitable means. Usually, it is preferable to utilize distillation. In any case, because the intended product of tetracyclododecene is decomposed at higher temperatures, it is important to keep the maximum temperature in each distillation tower at 200° C. or lower so that tetracyclododecene will not be exposed to a decomposing atmosphere.

BEST METHOD FOR CARRYING OUT THE INVENTION

In the following, the present invention will be described in more detail with examples.

EXAMPLE 1

A mixture of norbornene/dicyclopentadiene/ethylene having the molar ratio of 8/1/1 was supplied to a reactor. The purity of the initial feedstock of norbornene is 99.7%. The purities of dicyclopentadiene and ethylene to be supplied continuously were 94.7% and 99.9%, respectively. The percentage of dicyclopentadiene was 12.9 mass % against the solution of all feedstocks supplied to a reactor.

In the reactor, the pressure was kept at 5 MPa, the residence time was 0.25 hours, and the reaction temperature was 230° C.

Tetracyclododecene having purity of 99.6% was obtained by distilling the reaction mixture taken out of the reactor. The content of the trimers in a tetracyclododecene fraction was 1,000 ppm, and the content of the trimer of the structure shown in said formula [II] was 150 ppm. During the reaction, the distillation and the like, no change occurred as time passed, and a steady operation could be continued.

The conversion of dicyclopentadiene was 92%, and that of ethylene was 72%. The yield of tetracyclododecene having purity of 99.6% was 76% (based on dicyclopentadiene).

Into a round-bottle flask of 2 liter equipped with stirring blades was introduced 1,000 ml of toluene having been dried under the atmosphere of nitrogen. Further, into this flask were added 1 mmol of dichloroethoxy-oxovanadium and 10 g of the -previously synthesized tetracyclododecene composition containing 1,000 ppm of trimers of cyclopentadiene and 150 ppm of the trimer of cyclopentadiene shown in the formula [II]. Mixed gas of ethylene and nitrogen (molar ratio: ethylene/nitrogen=1/5) was bubbled into the solution at a rate of 200 liter/h while the solution was stirred. Then, the reaction was initiated by dropping 10 mmol of ethylaluminum sesquichloride into it, and a polymerization was carried out at 5° C. for 20 minutes.

The polymerization was terminated by addition of 30 ml of methanol, then the reaction mixture was poured into 2 liter of methanol to precipitate the copolymer. The copolymer was dried under reduced pressure, and molded into a press sheet having a thickness of 1 mm. A uniform and transparent sheet was obtained, which showed nothing like gel.

Comparative Example 1

The molar ratio of norbornene/dicyclopentadiene/ethylene in Example 1 was changed into 8/4/1, and the similar operation was carried out. Here, the percentage of dicyclopentadiene was 36.7% against the solution of all feedstocks supplied to the reactor.

The purity of tetracyclododecene composition obtained was 98.5%, the content of trimers of cyclopentadiene was 8,500 ppm, and the content of the trimer of cyclopentadiene shown in said formula [II] was 3,500 ppm.

Copolymerization with ethylene was carried out in the manner similar to that in Example 1, except for using the tetracyclododecene compound mentioned above, and a press sheet was made. In the sheet, the presence of gel was confirmed. Furthermore, when the gels were cut off and heated on a hot plate up to 300° C., they did not melt.

EXAMPLE 2

Ethylene, norbornene, and dicyclopentadiene having a purity of 94.6% were subjected to reaction at 200° C. in an autoclave for 2 hours. Here, the molar ratio of ethylene against dicyclopentadiene was 1. The reaction liquid was distilled to give tetracyclododecene, which contained 35,000 ppm of the hydrocarbon having a molecular weight of 188. The content of the hydrocarbon compound having a molecular weight of 188 was determined with a GC-mass spectrometry and a GC-infrared spectrophotometry, whereupon each spectrum coincided with that shown in FIG. 1 and FIG. 2.

Tetracyclododecene (22 g) obtained above and toluene (120 ml) were introduced into an entirely dried autoclave of 500 ml. Triethylaluminum (1.5 mmol) was added to the above mixture, and further, tetrachlorotitanium (0.3 mmol) and triethylamine (3 mmol) were added to carry out a ring opening polymerization at 30° C. for 6 hours.

The reaction mixture was poured into a mixture of acetone and isopropyl alcohol to precipitate a polymer. The obtained polymer was dissolved again in toluene, and further, the operation of reprecipitation was repeated twice, and the polymer (19 g) was obtained after dried under reduced pressure.

Into an autoclave of 200 ml were introduced 0.5% palladium-carbon (0.4 g) and toluene (100 ml), and further, the polymer (4 g) obtained by the ring opening polymerization was added. Hydrogenation was carried out with a hydrogen pressure of 5 MPa at 20° C. for 1 hour. After the reaction, catalysts were filtered off, and the reprecipitation was carried out with methanol.

By analyzing the polymer obtained with a differential scanning calorimeter, a glass transition temperature was found out to be 161.5° C. Comparing with the result of the following Comparative Example 2, where tetracyclododecene containing a large quantity of the hydrocarbon compound having a molecular weight of 188 was polymerized, the glass transition temperature of the resin obtained by the polymerization was found to be higher.

Comparative Example 2

Ethylene, norbornene, and dicyclopentadiene having a purity of 94.6% were subjected to reaction under the conditions similar to that in Example 2, except for carrying out in an autoclave at 320° C., to obtain tetracyclododecene that contains 77,000 ppm of the hydrocarbon compound having a molecular weight of 188. The content of the hydrocarbon compound having a molecular weight of 188 was determined with a GC-mass spectrometry and a GC-infrared spectrophotometry, whereupon each spectrum coincided with that shown in the above figure.

Polymerization and hydrogenation were carried out in the manner similar to that in Example 2, except for using tetracyclododecene containing 77,000 ppm of the compound having a molecular weight of 188, to obtain a polymer. By analysis with a differential scanning calorimeter, a glass transition temperature was found out to be 157.6° C. Further, the optical properties of the polymer obtained were in no way inferior to those of the resin obtained in Example 2.

EXAMPLE 3

Tetracyclododecene (20 g) containing 35,000 ppm of the compound having a molecular weight of 188 obtained in Example 2, norbornene (2.5 g), dicyclopentadiene (2.5 g) and toluene (200 ml) were introduced into an entirely dried autoclave of 500 ml. Triethylaluminum (3 mmol) was added to the above mixture, and further, tetrachlorotitanium (0.7 mmol) and triethylamine (7 mmol) were added to carry out a ring opening polymerization at 30° C. for 6 hours.

The reaction mixture was poured into mixture of acetone and isopropyl alcohol to precipitate a polymer. The obtained polymer was dissolved again in toluene, and further, the operation of reprecipitation was repeated twice, and the polymer (21 g) was obtained after being dried under reduced pressure.

Into an autoclave of 200 ml were introduced 0.5% palladium-carbon (0.4 g) and toluene (100 ml), and further, the polymer (4 g) obtained by the ring opening polymerization was added. Hydrogenation was carried out with a hydrogen pressure of 5 MPa at 20° C. for 1 hour. After the reaction, catalysts were filtered off, and the reprecipitation was carried out with methanol.

By analyzing the polymer obtained with a differential scanning calorimeter, a glass transition temperature was found out to be 134.9° C. Comparing with the result of the following Comparative Example 3, where tetracyclododecene containing a large quantity of the hydrocarbon compound having a molecular weight of 188 was polymerized, the glass transition temperature of the resin obtained by the polymerization was found to be higher.

Comparative Example 3

Polymerization and hydrogenation were carried out in the manner similar to that in Example 3, except for using tetracyclododecene containing 77,000 ppm of the compound having a molecular weight of 188 obtained in Comparative Example 2, to obtain a polymer. By analysis with a differential scanning calorimeter, a glass transition temperature was found out to be 130.3° C. Further, the optical properties of the polymer obtained were in no way inferior to those of the resin obtained in Example 3.

EXAMPLE 4

With a tube-type reactor made of stainless steel having an inner diameter of 5 mm was used, only the portion corresponding to the capacity of 25 ml (127 cm) was immersed in an oil bath controlled at 250° C. Norbornene (1,170 g), dicyclopentadiene (205 g) and 2,2,4-trimethylpentane (206 g) were mixed and sent to the tube-type reactor by a pump so that the space velocity will be 4.0 $h^{-1}$ based on the sum total of flow rates of norbornene and dicyclopentadiene. Before the mixture entered into a heating zone, ethylene was added continuously so that the molar ratio of ethylene and dicyclopentadiene will be 1:1. With a pressure control valve, a pressure of 5 MPa was maintained in the reaction system. After a steady continuous operation was carried out for an hour, a reaction mixture was obtained.

The reaction mixture obtained was sent to a batch type distillation apparatus having a theoretical plate number of 15. Then, the distillation was carried out under the conditions of a pressure in the system of 67 kPa and a reflux ratio of 3, so as to recover a mixed fraction of norbornene and 2,2,4-trimethylpentane. As a result, the sampled fraction of 80~84° C. was composed of 700 mmol of norbornene and 98 mmol of 2,2,4-trimethylpentane. During the distillation, city water was used as a cooling medium for condensing. However, the sedimentation of norbornene did not occur in any part around the cooling pipes for refluxing, and further, neither its loss nor settling out into vacuum lines were observed at all.

EXAMPLE 5

A reaction was carried out in the manner completely similar to that in Example 4, except for using ethylcyclopentane (206 g) instead of 2,2,4-trimethylpentane (206 g) to obtain a reaction mixture.

The reaction mixture obtained was distilled in the manner similar to that in Example 4, to recover a mixed fraction of norbornene and ethylcyclopentane, which was found to consist of 700 mmol of norbornene and 115 mmol of ethylcyclopentane. Though tap water was used as a coolant for liquefaction during the distillation, no solidifying of norbornene occurred in any part close to cooling pipes for reflux, and nor losses to a vacuum line, nor solidifying therein were found at all.

Comparative Example 4

A reaction was carried out in the manner similar to that in Example 4, except for using no 2,2,4-trimethylpentane. However, all lines except a heating zone were heated to 60° C.

The reaction mixture obtained was distilled in the manner similar to that Example 4 to recover norbornene. Tap water was used as a coolant for liquefaction during the distillation, and norbornene solidified in the part of cooling pipes for reflux, so that the distillation could not be carried out.

EXAMPLE 6

A continuous production of tetracyclododecene was carried out under the process flow as shown in FIG. 3. A feedstock of a mixture containing norbornene/ethylcyclopentane (solvent) in a weight ratio of 85/15 was supplied to a reactor, and commercially available dicyclopentadiene and ethylene were introduced continuously after the reaction started. On that occasion, the molar ratio of norbornene/dicyclopentadiene/ethylene was 10/1/1. The purity of norbornene supplied at the beginning was 99.7%, and the commercially available dicyclopentadiene and ethylene were 94.7% and 99.9% in purity, respectively.

In the continuous operation, the space velocity was 2 $h^{-1}$ based on the mixed liquid of norbornene and ethylcyclopentane, the temperature in the reactor 5 was 230° C., and the reaction pressure was 5 MPa.

With the first distillation tower 6 having a theoretical plate number of 20, ethylene was separated continuously from the top of the tower under the pressure of 400 kPa. A mixed liquid taken out of the bottom of the first distillation tower was sent to the second distillation tower 7 having a theoretical plate number of 30. Then the mixed liquid of norbornene and ethylcyclopentane was recovered under the conditions of a pressure 20 kPa and a temperature of the top of the tower 43° C. In the mixed liquid of norbornene and ethylcyclopentane recovered from the top of the tower, was there not contained MTHI substantially.

The recovered liquid mentioned above was somewhat deviated in weight ratio from the initial value of norbornene/ethylcyclopentane=85/15 owing to the loss of solvent. Therefore, the amount of ethylcyclopentane corresponding to the loss was supplied continuously from the feed tank.

The mixed liquid taken out from the second distillation tower 7 was refined in the third distillation tower (not shown) to obtain tetracyclododecene having a purity of 99.6%. During the operation, no change was observed as time passed and a steady operation could be continued for 10 days or more.

The conversion of dicyclopentadiene was 92%, and that of ethylene was 72%. The yield of tetracyclododecene having a purity of 99.6% was 76% (based on dicyclopentadiene).

Comparative Example 5

A continuous reaction was carried out in the manner similar to that in Example 5, except that the pressure was 8 kPa and the temperature of the top of the tower was 28° C. in the second distillation tower 7.

Although the purity of the intended compound of tetracyclododecene was kept at 99.6%, 1,050 ppm of MTHI was mixed into a mixture liquid of norbornene and ethylcyclopentane recovered. As a result, the amount of high-boiling compounds increased with the time, and the yield of tetracyclododecene and the conversion of ethylene decreased as time passed.

INDUSTRIAL APPLICABILITY

When the present tetracyclododecene composition containing a specific range of the amount of trimers of cyclopentadiene is used to carry out addition polymerization reaction with Ziegler catalysts, the reactivity is excellent and little gelation occurs in polymers.

Further, when the present tetracyclododecene composition containing a restricted amount of the hydrocarbon compound having a molecular weight of 188 is used, polymers having high glass transition temperatures are obtained in various types of polymerization.

In said production of tetracyclododecene, by using a solvent having a boiling point close to that of norbornene according to the present invention, it is possible to restrain norbornene from solidifying and carry out a steady distillation.

Moreover, by using the present continuous process for producing tetracyclododecene, which combines reaction, distillation and recovery/circulation, it is possible to recover norbornene that does not substantially contain methyltetrahydroindene and to obtain tetracyclododecene of a high purity.

What is claimed is:

1. A method for producing a tetracyclododecene composition comprising impurities in regulated amounts, which method comprises reacting while mixing and heating a mixture of ethylene, cyclopentadiene and/or dicyclopentadiene and norbornene to produce said tetracyclododecene composition, wherein said composition contains as an impurity 100 to 5,000 ppm of trimers of cyclopentadiene, and further wherein said composition is capable of addition polymerization in the presence of a Ziegler catalyst.

2. A method for producing a tetracyclododecene composition as claimed in claim 1, which method comprises adjusting the molar ratio of cyclopentadiene and/or dicyclopentadiene converted as cyclopentadiene relative to said norbornene to 0.1 to 0.6, and adjusting the molar ratio of ethylene relative to said norbornene to 0.05 to 0.3.

3. A method for producing a tetracyclododecene composition as claimed in claim 1, which method comprises adjusting the weight ratio of cyclopentadiene and/or dicyclopentadiene converted as cyclopentadiene relative to the sum total of said ethylene, cyclopentadiene and/or dicyclopentadiene and norbornene to 0.06 to 0.30.

4. A method for producing the tetracyclododecene composition as claimed in claim 1, wherein the reaction is carried out in the presence of an inert hydrocarbon solvent.

5. A method for producing a tetracyclododecene composition claimed in claim 4, wherein said hydrocarbon solvent is a branched aliphatic hydrocarbon or an alicyclic hydrocarbon.

6. A method for producing a tetracyclododecene composition as claimed in claim 1, wherein the content of the trimer of cyclopentadiene of formula II

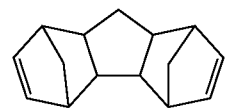

[II]

is 10 to 3,000 ppm.

7. A method for producing a tetracyclododecene composition as claimed in claim 6, which method comprises adjusting the molar ratio of cyclopentadiene and/or dicyclopentadiene converted as cyclopentadiene relative to said norbornene to 0.1 to 0.6, and adjusting the molar ratio of ethylene relative to said norbornene to 0.05 to 0.3.

8. A method for producing a tetracyclododecene composition as claimed in claim 6, which method comprises adjusting the weight ratio of cyclopentadiene and/or dicyclopentadiene converted as cyclopentadiene relative to the sum total of said ethylene, cyclopentadiene and/or dicyclopentadiene and norbornene to 0.06 to 0.30.

9. A method for producing the tetracyclododecene composition as claimed in claim 6, wherein the reaction is carried out in the presence of an inert hydrocarbon solvent.

10. A method for producing a tetracyclododecene composition as claimed in claim 1, further comprising separating and removing ethylene from the said composition which results from the said reaction step.

11. A method for producing a tetracyclododecene composition as claimed in claim 10 further comprising separating and recovering norbornene which contains 700 ppm or less of methyltetrahydroindene, from the reaction mixture taken out of said step (2).

12. A method for producing tetracyclododecene as claimed in claim 1 the said mixture further comprising an aliphatic solvent having a boiling point at atmospheric pressure which differs from the boiling point of norbornene at atmospheric pressure by less than 10° C.

13. A method for producing tetracyclododecene as claimed in claim 1, wherein the said reaction is carried out in the presence of an aliphatic hydrocarbon solvent which has a boiling point at atmospheric pressure that is within 10° C. of the boiling point of norbornene at atmospheric pressure.

14. A method for producing tetracyclododecene as claimed in claim 1, wherein the yield of tetracyclododecene is about 76%.

15. A method for producing a tetracyclododecene composition which method comprises the steps of (1) to (3):
  (1) mixing and heating ethylene, cyclopentadiene and/or dicyclopentadiene and norbornene in the presence of an aliphatic solvent, whose boiling point at atmospheric pressure is in the range of minus 10° C. to plus 10° C. as compared with the boiling point of norbornene at atmospheric pressure, thereby producing a reaction mixture containing at least norbornene, tetracyclododecene and an aliphatic solvent,
  (2) recovering a mixture composed of at least norbornene and said aliphatic solvent from said reaction mixture by means of distillation, and circulating the thus recovered mixture to said step (1), and
  (3) separating and recovering tetracyclododecene from the reaction mixture taken out of said step (2).

16. A method for producing continuously a tetracyclododecene composition, which method comprises the steps of (1) to (5):
  (1) supplying and mixing ethylene, cyclopentadiene and/or dicyclopentadiene and norbornene to a reactor and reacting them in the presence of heat to produce a reaction mixture containing at least tetracyclododecene, norbornene and methyltetrahydroindene,
  (2) separating and removing ethylene from said reaction mixture,
  (3) separating and recovering norbornene which contains 700 ppm or less of methyltetrahydroindene, from the reaction mixture taken out of said step (2),
  (4) circulating at least a part of norbornene separated and recovered in said step (3) to said reactor, and
  (5) separating and recovering tetracyclododecene from the reaction mixture taken out of said step 3.

17. A method for continuously producing the tetracyclododecene composition as claimed in claim 16, wherein in step (1) a solvent is supplied along with the said ethylene, cyclopentadiene and/or dicyclopentadiene, and norbornene to the said reactor prior to the said reaction to form a reaction mixture, and wherein step (3) comprises separating and recovering a mixture of norbornene and a solvent, which contains 700 ppm or less of methyltetrahydroindene, from the reaction mixture taken out of said step (2).

18. A composition used for polymerization comprising tetracyclododecene as represented by the formula I:

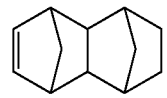

[I]

and impurities, wherein the impurity content is regulated to reduce harmful influences when said composition is used for polymerization, said impurities comprising trimers of cyclopentadiene represented by the formulae II and III:

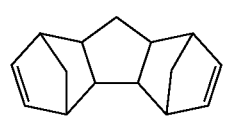

[II]

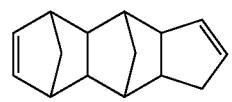

[III]

the content of said trimers of cyclopentadiene being 100 to 5,000 ppm, and wherein said composition is capable of addition polymerization in the presence of a Ziegler catalyst.

19. A composition as claimed in claim 18, wherein the content of said trimer of cyclopentadiene represented by formula II is 10 to 3,000 ppm.

20. A composition used for polymerization comprising tetracyclododecene as represented by formula I:

[I]

said composition containing as an impurity 1 to 70,000 ppm of a hydrocarbon having only one carbon-carbon double bond and having the molecular weight of 188.

21. A composition as claimed in claim 20, wherein said hydrocarbon impurity is present in the amount of from 10 to 50,000 ppm.

* * * * *